United States Patent [19]
Iwazaki

[11] Patent Number: 5,642,507
[45] Date of Patent: Jun. 24, 1997

[54] APPARATUS FOR COLLECTING CONTROL DATA OF A VIRTUAL MACHINE AND METHOD OF THEREOF

[75] Inventor: Masanori Iwazaki, Kawasaki, Japan

[73] Assignee: Fujitsu Limited, Kawasaki, Japan

[21] Appl. No.: 4,257

[22] Filed: Jan. 14, 1993

[30] Foreign Application Priority Data

Jan. 14, 1992 [JP] Japan .................................. 4-004868

[51] Int. Cl.$^6$ .................................................. G06F 9/44
[52] U.S. Cl. ..................... 395/670; 395/671; 395/672; 395/676; 395/677; 395/678
[58] Field of Search .................................. 395/650, 700, 395/670, 671, 672, 676, 677, 678; 364/978.2, 978.1, 976.3, 281.3, 281.4

[56] References Cited

U.S. PATENT DOCUMENTS

| | | | |
|---|---|---|---|
| 4,400,769 | 8/1983 | Kaneda et al. | 364/200 |
| 4,674,038 | 6/1987 | Brelsford et al. | 364/200 |
| 4,887,202 | 12/1989 | Tanaka et al. | 364/200 |
| 4,912,628 | 3/1990 | Briggs | 364/200 |
| 5,095,427 | 3/1992 | Tanaka et al. | 395/700 |
| 5,109,489 | 4/1992 | Umeno et al. | 395/275 |
| 5,187,802 | 2/1993 | Inoue et al. | 395/800 |

FOREIGN PATENT DOCUMENTS 3-202923  9/1991  Japan .

OTHER PUBLICATIONS

"Operating Systems" by H.M. Deitel, 1990, pp. 703–723.

"Process Control Structures for Multiprocessors" by Ziya Aral et al, 1991 IEEE, pp. 49–58.

"Flexible Schemes for Application–Level Fault Tolerance" by L. Stringini et al, 1991 IEEE pp. 86–95.

Primary Examiner—Kevin A. Kriess
Assistant Examiner—Michael T. Richey
Attorney, Agent, or Firm—Staas & Halsey

[57] ABSTRACT

An apparatus for collecting control data of a virtual machine in order to collect control data of a control portion (CP) of a virtual machine as well as control data of an operating system (OS) controlled by the CP, and a method thereof to simultaneously collect the CP data and the OS data. The function of the OS that uses the data which is to be collected is suppressed at the time when the data are to be collected, and the OS requests the CP to transfer the CP data. In response to the data transfer request, the function of the CP using the data that are to be collected is suppressed, and then the CP data are transferred to the buffer of the OS. The function of the CP that had been suppressed is then resumed. The OS simultaneously edits and outputs the data transferred from the CP and the OS data that exist on the OS, and then the function of the OS that had been suppressed is resumed.

8 Claims, 10 Drawing Sheets

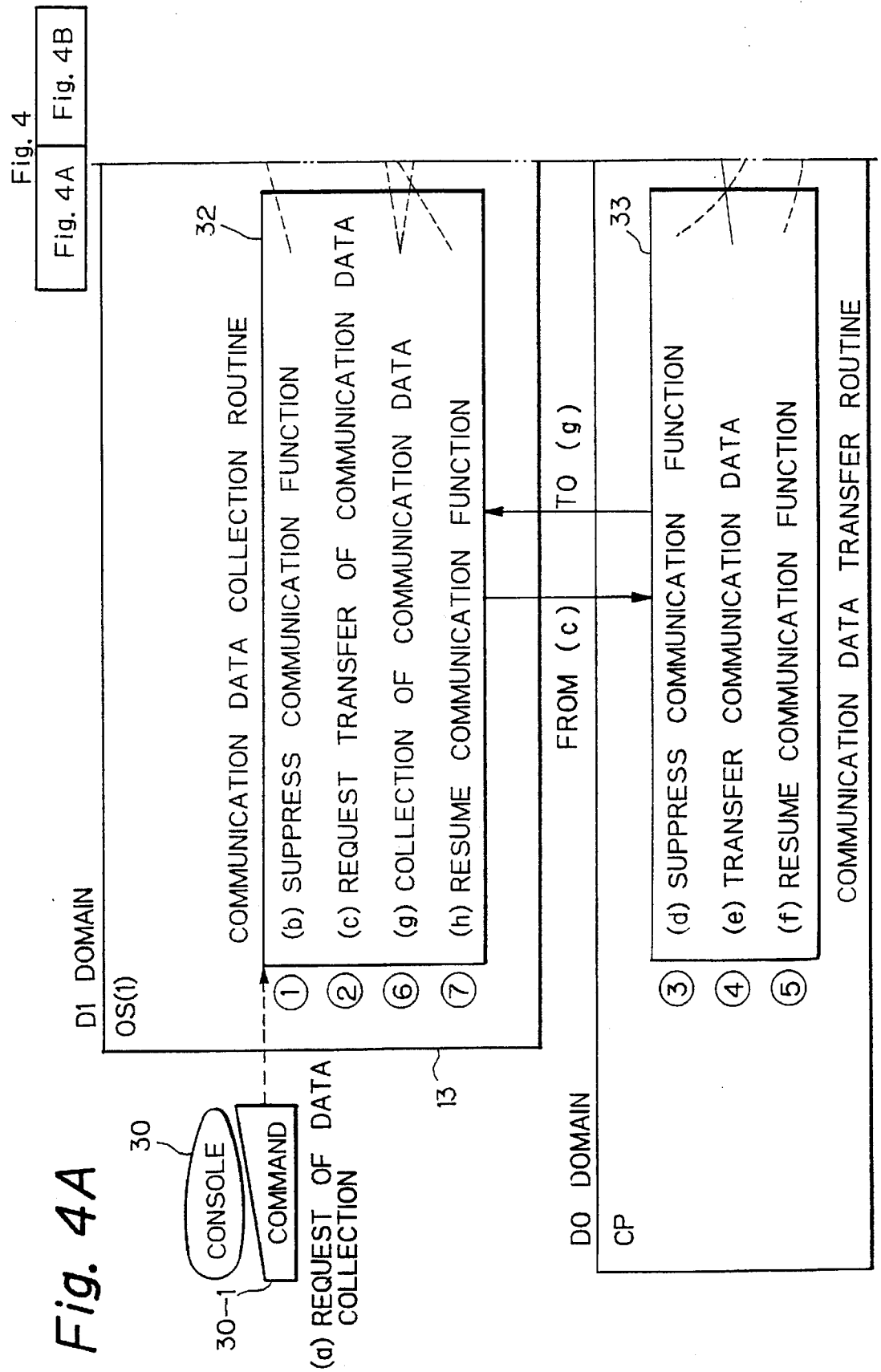

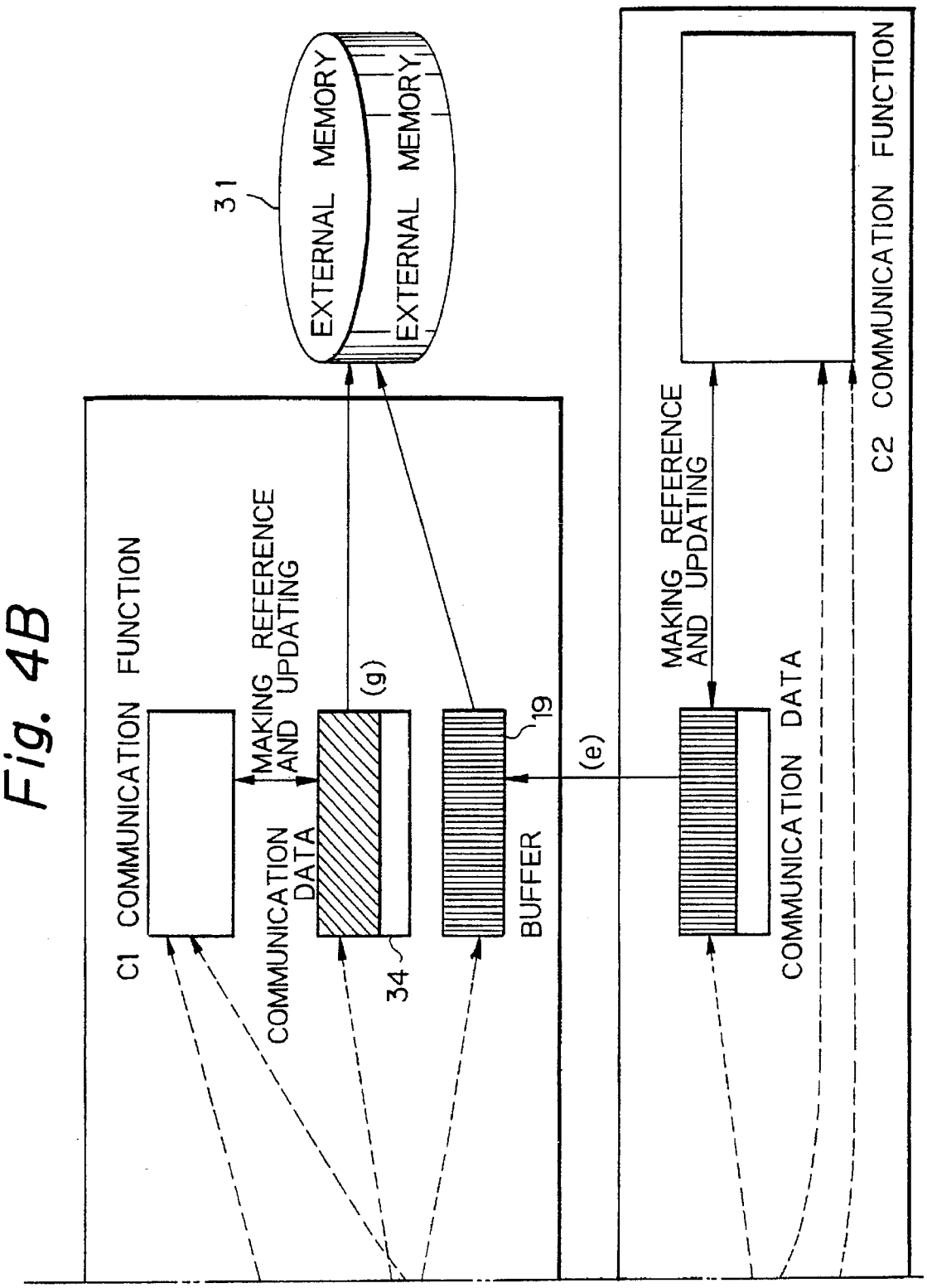

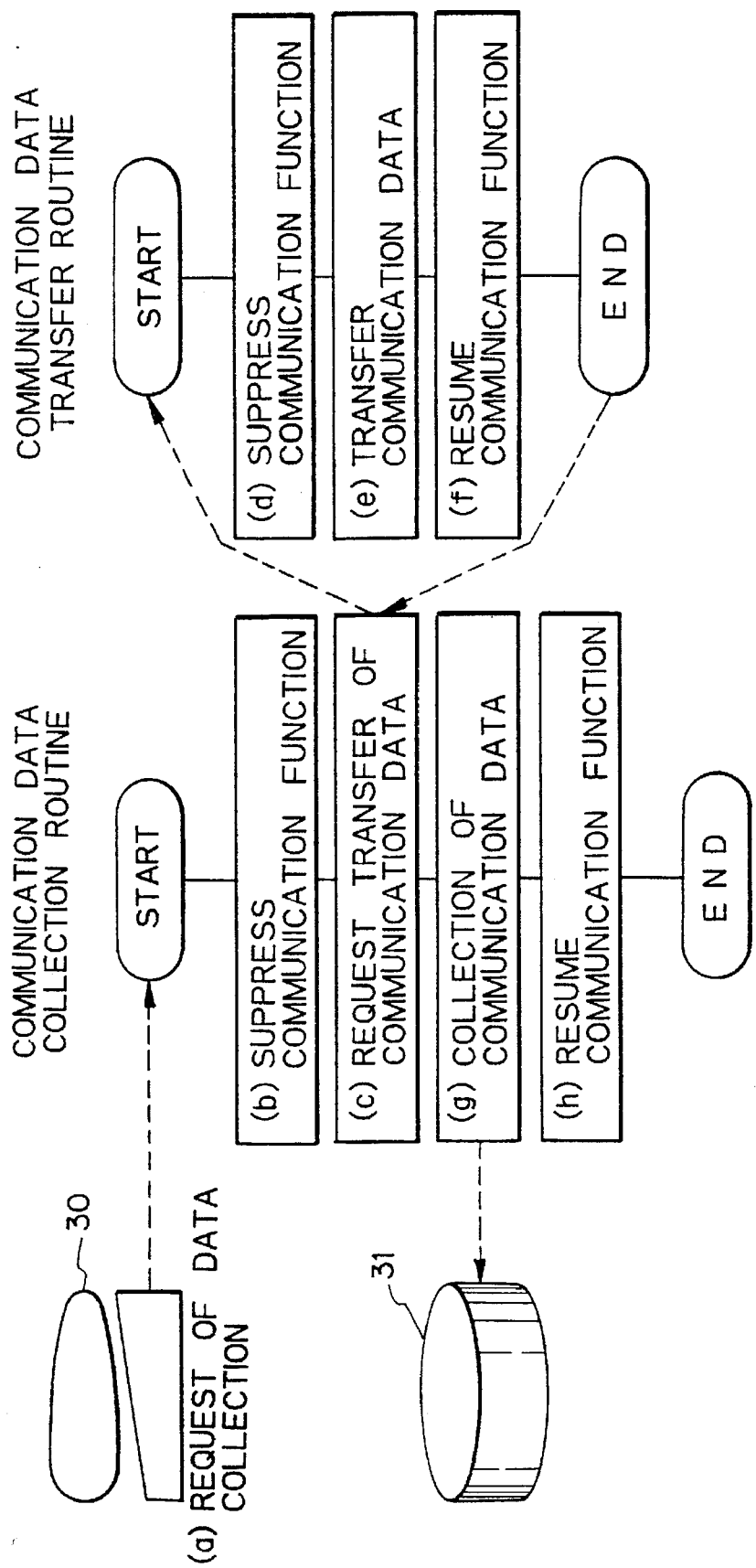

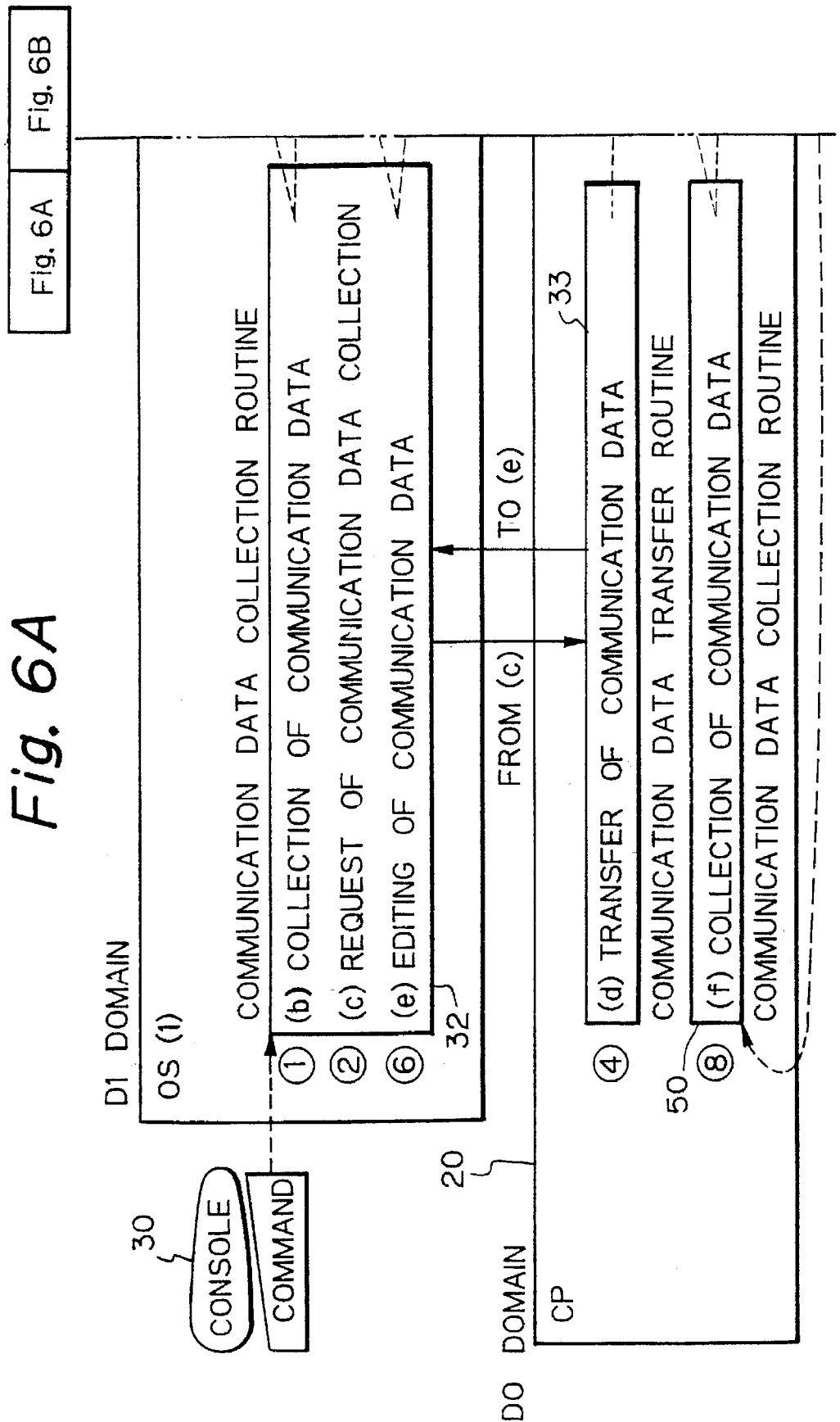

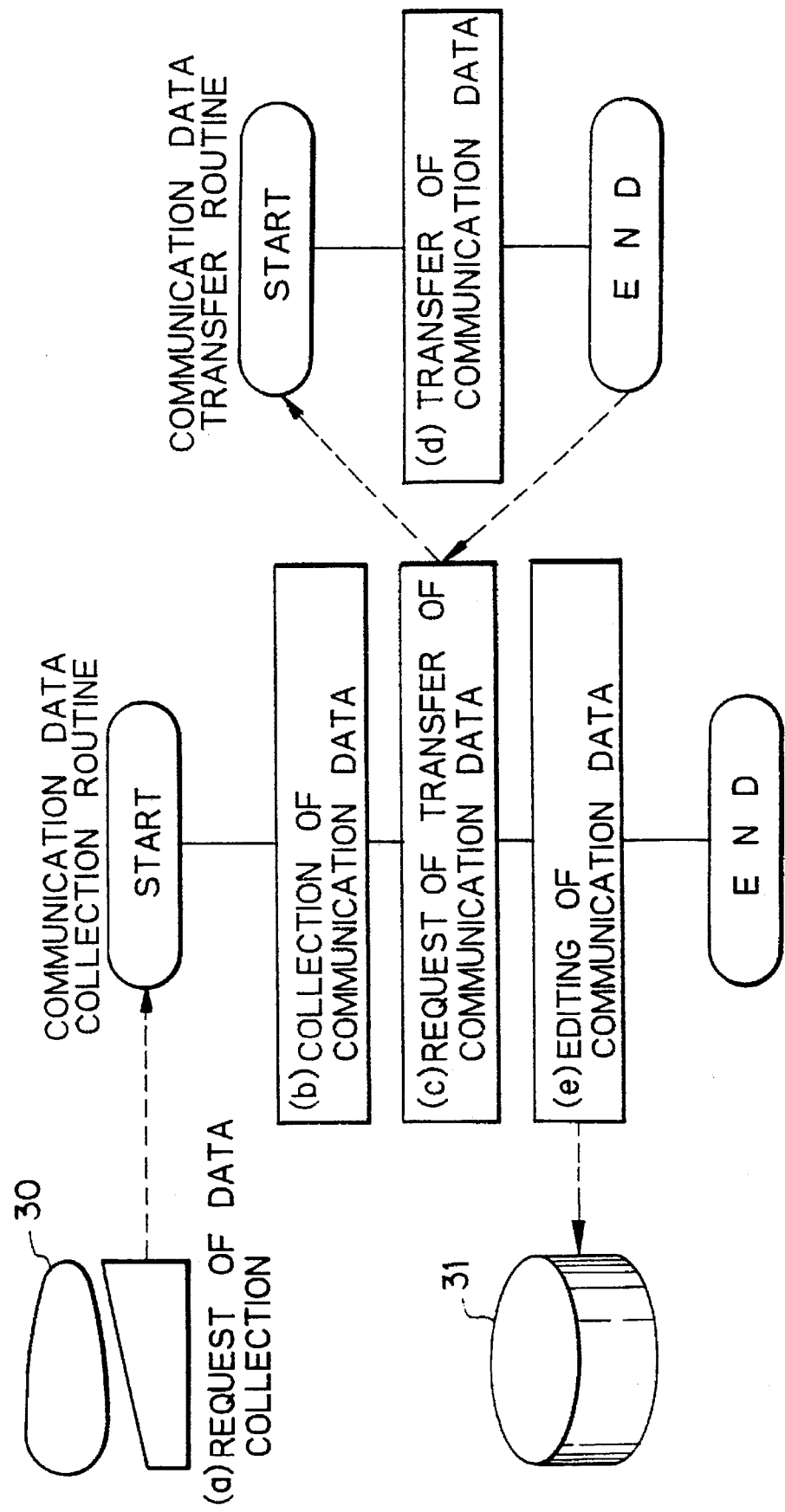

APPARATUS FOR COLLECTING CONTROL DATA OF A VIRTUAL MACHINE AND METHOD OF THEREOF

BACKGROUND OF THE INVENTION

1. Field of the Invention

The present invention relates to an apparatus and method for collecting control data of a control portion (hereinafter referred to as CP) as well as control data of an operating system (hereinafter referred to as OS) in the linkage between the CP and OS in a virtual machine.

Accompanying the trend toward operating a system without interrupting the operation of computers in recent years, it has been demanded to provide a function for easily collecting data in the case of the occurrence of trouble or the like without the need of interrupting the operation of the system. Furthermore, in a virtual machine system having an increased degree of OS/CP linking functionality, it is demanded to simultaneously collect the data of the CP and of the OS in order to maintain reliability in the data collection. Therefore, a function is required to collect data of different environments, i.e., CP and OS in a manner linked to each other.

2. Description of the Related Art

In a case where trouble has developed in software, for example, the contents of the main memory are output to an external memory at the time when the trouble developed and are analyzed in order to investigate the cause of the trouble. The function for outputting the contents of the main memory to the external memory is called a dumping function.

So far, few systems have been employed to effect the dumping in the conventional virtual machine systems. For instance, there has been proposed a system in which when trouble develops under the condition where two OSs are operating under the control of the CP, the contents of the main memory are output at one time to an output medium such as a magnetic tape or a magnetic disk. In this system, however, since the data of these OSs has not been edited, there arise such problems that the required data is incomplete and that the analysis requires laborious work over extended periods of time.

According to another system, the OS outputs the data thereof to an output medium in response to a data collection instruction from an external unit or an internal unit, while the CP quite independently outputs the data thereof to another output medium. However, this system lacks reliability for the collected data since the OS data and the CP data are collected at different times from each other.

According to a further system, the OS outputs its own control data to the output medium upon receipt of a data collection instruction. Further, the OS informs the CP of the data collection instruction to request the dumping of the CP data. The CP outputs the CP data to a separate output medium. This system is capable of dumping the contents of the main memory without interrupting the operation of the system but involves the probability that the data being collected may undergo a change during the dumping and that inconsistency may take place between the OS data and the CP data that are collected.

As a control data collection function other than dumping in the virtual machine system, there is a console display function for displaying the contents of the main memory. However, the console display function is not capable of displaying large amounts of the OS data and the CP data under the condition where the contents of the memory are frozen at a time when trouble has developed.

As described above, the CP has a CP dumping function and the OS has an OS dumping function. However, it is not allowed to simultaneously collect the control data of the OS and the related control data of the CP without interrupting the operation of the computers. That is, since the CP data and the OS data are collected separately, reliability of the data becomes poor and investigation involves is difficult due to inconsistency in the data.

SUMMARY OF THE INVENTION

The object of the present invention is to solve the above-mentioned problems and to provide a means for simultaneously collecting the CP data and the OS data.

According to the present invention, there is provided an apparatus for collecting control data of a virtual machine in a computer system which has a control portion CP of the virtual machine and an OS operating on the virtual machine arranged in a main memory, wherein the OS comprises an OS function suppression processing means which, at the time of collecting the data, suppresses the function of the OS that uses data which are to be collected; a CP data transfer request processing means which requests the CP to transfer the data that are related to the CP and are to be collected; an OS/CP data collection processing means which edits and outputs the data transferred from the CP and the OS data that exist on the OS; and an OS function resumption processing means which resumes the function of the OS that had been suppressed after the data are collected.

The CP comprises a CP function suppression processing means which, upon receipt of a data transfer request from the OS, suppresses the function of the CP that uses data which are to be collected; a CP data transfer processing means which transfers the data that are related to the CP and are to be collected to a region which is accessible by the OS; and a CP function resumption processing means which resumes the function of the CP that had been suppressed after the data are transferred.

Accordingly, the apparatus can simultaneously collect the data related to the OS and the data related to the CP.

According to the present invention, furthermore, there is provided an apparatus for collecting control data of a virtual machine in a computer system which has a control portion CP of the virtual machine and an OS operating on the virtual machine arranged in a main memory, wherein the OS comprises a main OS function processing means which constitutes a function of the OS that uses data which are to be collected; an OS data collection processing means which collects the data used by the main OS function processing means; a CP data transfer request processing means which requests the CP to transfer the data that are related to the CP and are to be collected; and an OS/CP data collection processing means which edits and outputs the data transferred from the CP and the data collected by the OS data collection processing means.

The CP comprises a CP function processing means which constitutes the function of the CP that uses the data which are to be collected; a CP data collection processing means which collects the data used by the CP function processing means; and a CP data transfer processing means which, upon receipt of a data transfer request from the OS, transfers a region where there are accumulated the data that are related to the CP and are to be collected to a region that is accessible by the OS.

Accordingly, the apparatus can simultaneously collect the data related to the OS and the data related to the CP.

The present invention further provides a method for carrying out the above.

BRIEF DESCRIPTION OF THE DRAWINGS

The present invention will be more clearly understood from the description as set forth below with reference to the accompanying drawings in which:

FIGS. 4A and 4B are diagrams which schematically illustrates an embodiment of the first fundamental constitution shown in FIG. 2;

FIG. 5 is a flow art of the embodiment of FIGS. 4A and 4B;

FIGS. 6A and 6B are a diagram which schematically illustrate an embodiment of the second fundamental constitution shown in FIG. 3; and FIGS. 7A and 7B are flow charts of the embodiment of FIGS. 6A and 6B.

DESCRIPTION OF THE PREFERRED EMBODIMENTS

Before describing the preferred embodiments according to the present invention, examples of the related art are described with reference to the accompanying drawings.

Figures 1A, 1B, 1C:
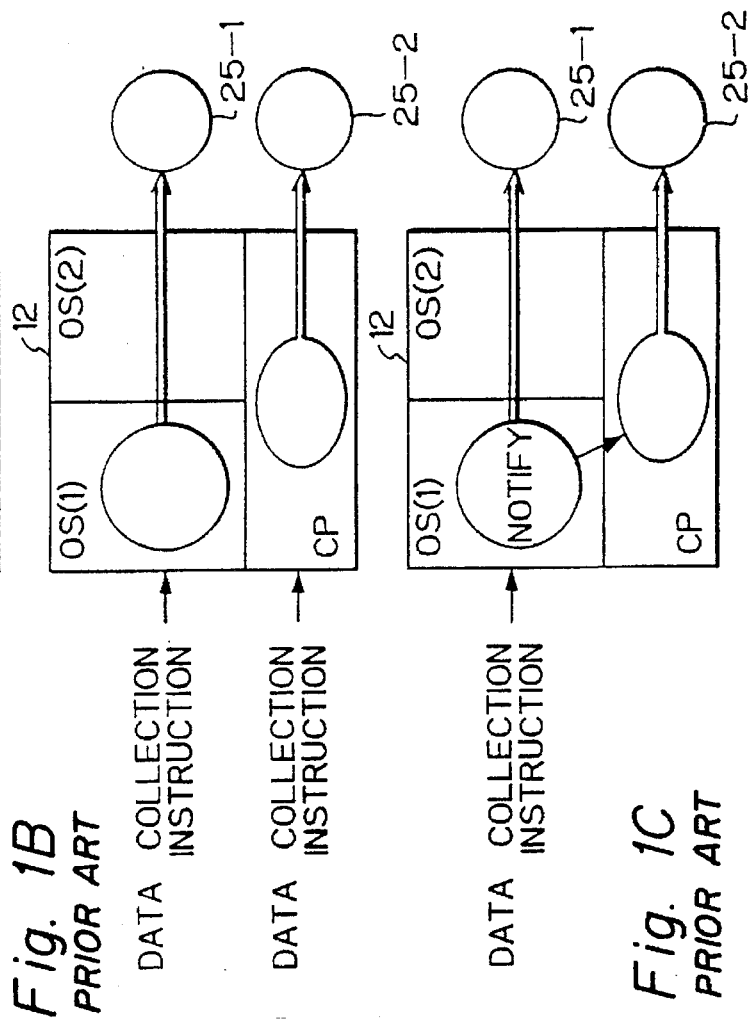
FIGS. 1A-1C are diagrams illustrating the related art.

In an example shown in FIG. 1(A), in a case when trouble has occurred, the contents of the main memory 12 are output at one time onto an output medium 25 such as a magnetic tape or a magnetic disk. Since the data of the OS(1) and the data of the OS(2) have not been edited in this system, there arise problems in that necessary data are lacking and laborious work and extended periods of time are required for the analysis.

In an example shown in FIG. 1(B), the OS(1) outputs the data thereof to an output medium 25-1 in response to a data collection instruction from an external unit or an internal unit and, on the other hand, the CP outputs the data thereof to an output medium 25-2 independently of each other. However, this system has a problem of poor reliability in the collected data since the OS data and the CP data are collected at different times.

In an example shown in FIG. 1(C), the OS(1) outputs its own control data to an output medium 25-1 upon receipt of a data collection instruction. Further, the OS(1) informs the CP of the data collection instruction to request the dumping of the CP data. The CP outputs the CP data to an output medium 25-2. This system is capable of dumping the contents of the main memory 12 without interrupting the operation of the system but involves a probability in that the data being collected may undergo a change during the dumping and that inconsistency may take place between the OS data and the CP data that are collected.

In all of the above-mentioned systems, therefore, it is not allowed to simultaneously collect the control data of the OS or the related control data of the CP without halting the operation of the computers, or the CP data and the OS data are separately collected, impairing reliability of the data and involving difficulty for carrying out the investigation due to inconsistency in the data.

Figure 2:
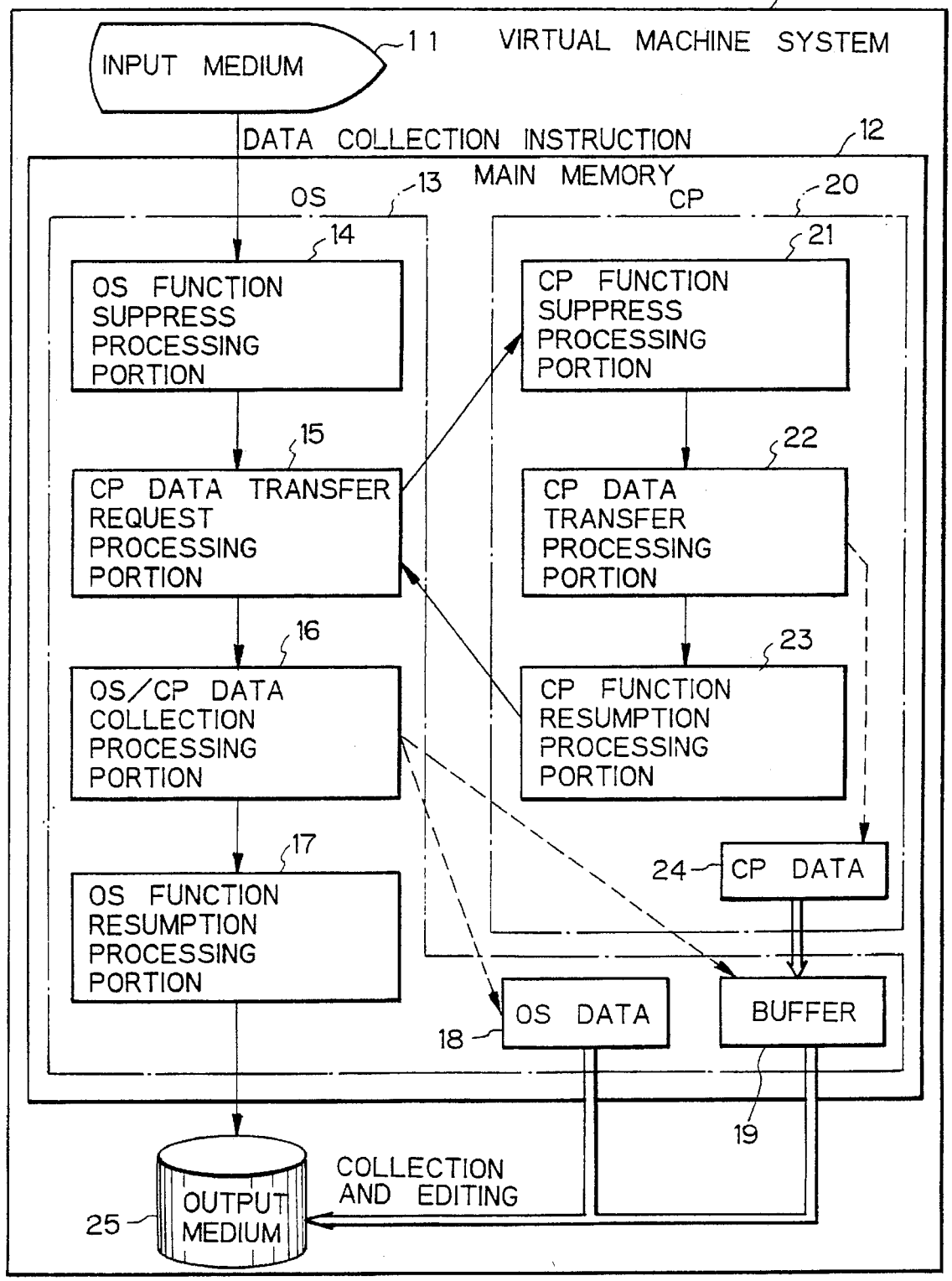
FIG. 2 is a block diagram which schematically illustrates a first fundamental constitution of an apparatus according to the present invention.

FIG. 2 is a block diagram which schematically illustrates a first fundamental constitution of an apparatus according to the present invention. In FIG. 2, reference numeral 10 denotes a virtual machine system, 11 denotes an input medium such as a console, 12 denotes a main memory, 13 denotes an operating system (OS) which operates on a virtual machine, 18 denotes OS data that are related to the OS 13 and are to be collected, 19 denotes a buffer provided in a region accessible by the OS, 20 denotes a control portion (CP) of the virtual machine, 24 denotes CP data that are related to the CP 20 and are to be collected, and reference numeral 25 denotes an output medium such as a magnetic tape or a magnetic disk.

According to the present invention, the OS 13 is provided with an OS function suppression processing portion 14, a CP data transfer request processing portion 15, an OS/CP data collection processing portion 16, and an OS function resumption processing portion 17.

The OS function suppression processing portion 14 is a processing means which, at the time of collecting the data, suppresses the function of the OS 13 that uses data which are to be collected. The CP data transfer request processing portion 15 is a processing means which requests the CP 20 to transfer the CP data 24 to the buffer 19 of the OS 13. The OS/CP data collection processing portion 16 is a processing means which edits the data in the buffer 19 transferred from the CP 20 and the OS data 18 that exist on the OS 13, and outputs them to the output medium 25. The OS function resumption processing portion 17 is a processing means which resumes the function of the OS 13 that had been suppressed after the data are collected.

The CP 20 is equipped with a CP function suppression processing portion 21, a CP data transfer processing portion 22, and a CP function resumption processing portion 23.

The CP function suppression processing portion 21 is a processing means which, upon receipt of a data transfer request from the CP data transfer request processing portion 15, suppresses the function of the CP 20 that uses data which are to be collected. The CP data transfer processing portion 22 is a processing means which transfers the CP data 24 that are to be collected to the buffer 19. The CP function resumption processing portion 23 is a processing means which resumes the function of the CP 20 that had been suppressed after the CP data 24 are transferred to the buffer 19.

In the data collection according to the present invention, when, for example, a data collection instruction is issued from the input medium 11, the OS function suppression processing portion 14 of the OS 13 suppresses the function of the OS 13 which uses the OS data 18 that are to be collected and, then, the CP data transfer request processing portion 15 requests the CP 20 to transfer the CP data 24.

Upon receipt of a data transfer request, the CP function suppression processing portion 21 of the CP 20 suppresses the function of the CP 20 that uses the CP data 24, and then the CP data transfer processing portion 22 transfers the CP data 24 to the designated buffer 19 in order to resume the function of the CP 20 that had been suppressed.

The OS/CP data collection processing portion 16 of the OS 13 simultaneously edits the CP data 24 transferred to the buffer 19 and the OS data 18 that are to be collected, and outputs them to the output medium 25. Thereafter, the OS function resumption processing portion 17 resumes the function of the OS 13 that had been suppressed.

Thus, the OS data 18 and the CP data 24 are simultaneously collected.

According to the present invention, the OS function suppression processing portion 14 and the CP function suppression processing portion 21 suppress the functions that use data which are to be collected, and the CP data transfer processing portion 22 transfers the CP data 24 to the buffer 19 to a region that is accessible by the OS 13. This enables the OS 13 to make reference to the CP data 24 in a false manner. Therefore, the OS data 18 and the CP data 24 can be simultaneously collected by the OS/CP data collection processing portion 16.

Figure 3:
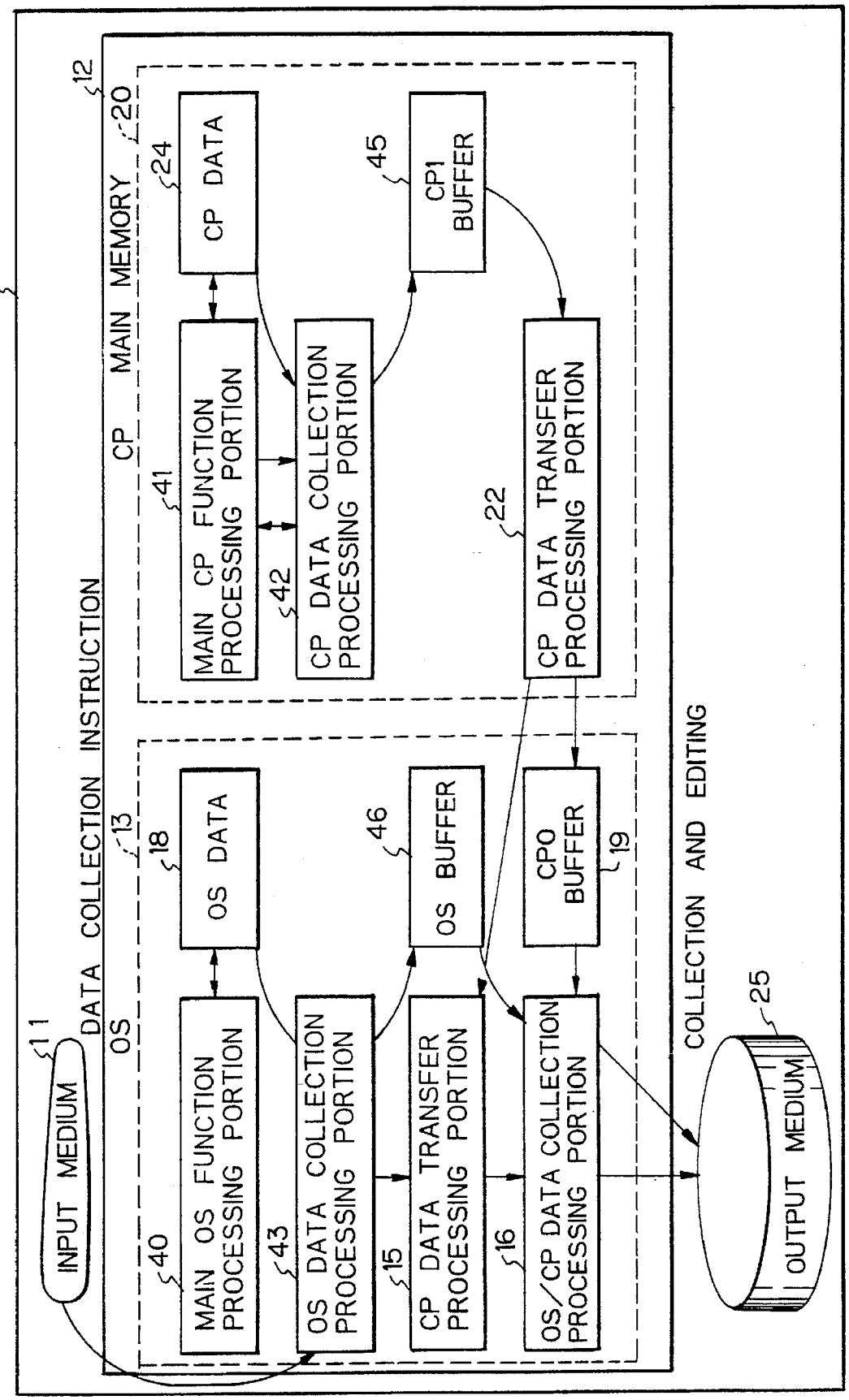
FIG. 3 is a block diagram which schematically illustrates a second fundamental constitution of the apparatus according to the present invention.

FIG. 3 is a block diagram which schematically illustrates a second fundamental constitution of the apparatus according to the present invention.

In FIG. 3, reference numeral 10 denotes a virtual machine system, 11 denotes an input medium such as a console, 12 denotes a main memory, 13 denotes an operating system (OS) that operates on a virtual machine, 18 denotes OS data that are related to the OS 13 and are to be collected, 46 denotes an OS buffer that is provided to store the OS data 18, reference numeral 19 denotes a CP1 buffer provided in a region that is accessible by the OS, 20 denotes a control portion (CP) of the virtual machine, 24 denotes CP data that are related to the CP 20 and are to be collected, 45 denotes a CP0 buffer that is provided to store the CP data 24, and reference numeral 25 denotes an output medium such as a magnetic tape or a magnetic disk.

In the present invention, the OS 13 is provided with a main OS function processing portion 40, an OS data collection processing portion 43, a CP data transfer request processing portion 15, and an OS/CP data collection processing portion 16.

The main OS function processing portion 40 is a processing means which uses data that are to be collected. The OS data collection processing portion 43 is a processing means which transfers the OS data 18 that exist on the OS 13 to the OS buffer 46. The CP data transfer request processing portion 15 is a processing means which requests the CP 20 to transfer the CP0 buffer 45 to the CP1 buffer 19 of the OS 13. The OS/CP data collection processing portion 16 is a processing means which edits the data in the CP1 buffer 19 transferred from the CP 20 and the data in the transferred OS buffer 46, and outputs them to the output medium 25.

The CP 20 is provided with a CP function processing portion 41, a CP data collection processing portion 42, and a CP data transfer processing portion 22.

The CP function processing portion 41 is a processing means which uses data that are to be collected. The CP data collection processing portion 42 is a processing means which transfers the CP data 24 that exist on the CP 20 to the CP0 buffer 45. The CP data transfer processing portion 22 is a processing means which transfers the CP data 24 to be collected to the CP1 buffer 19.

In the data collection according to the present invention, the CP data 24 that are usually collected by the CP data collection processing portion 42 are copied onto an empty entry of the CP0 buffer 45 (accumulated in the CP buffer 45) together with inherent data such as present time and identifier at a particular event of the CP function processing portion 41.

When, for instance, a data collection instruction is issued from the input medium 11, the OS data collection processing portion 43 of the OS 13 copies the OS data 18 to be collected onto the OS buffer 46 and, then, the CP data transfer request processing portion 15 requests the CP 20 to transfer the CP0 buffer 45.

In response to the data transfer request, the CP data transfer processing portion 22 of the CP 20 retrieves the entry of CP0 buffer 45 necessary for collecting the data relying upon inherent data accumulated in the CP0 buffer 45, and transfers the data to the designated CP1 buffer 19.

In the OS 13, the OS/CP data collection processing portion 16 simultaneously edits the CP data 24 transferred into the CP1 buffer 19 and the OS data 18 copied in the OS buffer, and outputs them to the output medium 25.

Thus, the OS data 18 and the CP data 24 are simultaneously collected.

Here, the main OS function processing unit 40 and the CP function processing unit 41 effect the processings (traditional processings) by using the OS data 18 and the CP data 24 that are to be collected, and operate by being linked to each other.

At the start of operation, the CP data collection processing portion 42 is informed of inherent data (identifiers and time of collection) from the CP function processing portion 41. The CP data collection processing portion 42 collects the CP data 24 together with the inherent data thereof in the CP0 buffer 45.

In the present invention, the CP data 24 copied by the CP data transfer processing portion 22 onto the CP0 buffer 45 are transferred to the CP1 buffer 19 in a region that is accessible by the OS 13. This enables the CP data 24 to be referred to by the OS 13 in a false manner. Furthermore, the OS data 18 collected by the OS data collection processing portion 43 which are in agreement with the CP data 24 accumulated in the CP0 buffer 45 at every event are retrieved. Therefore, the OS data 18 and the CP data 24 can be collected simultaneously. Accordingly, the OS data 18 and the CP data 24 can be simultaneously collected by the OS/CP data collection processing portion 16.

FIGS. 4A and 4B are diagrams illustrating the first fundamental constitution of FIG. 2 according to an embodiment of the present invention, and FIG. 5 is a flow chart of the embodiment of the present invention shown in FIGS. 4A and 4B.

FIGS. 4A and 4B show an embodiment of the present invention where the data of the communication function are collected according to an input instruction of a console command. In FIGS. 4A and 4B, reference numeral 30 denotes a console, 31 denotes an external memory such as a magnetic disk or a magnetic tape, 32 denotes a communication data collection routine provided at the nucleus of OS 13 or in a communication control sub-system, 33 denotes a communication data transfer routine provided in the CP 20, 34 denotes communication data in the OS 13 that are to be collected, 35 denotes communication data in the CP 20 that are to be collected, C1 denotes a communication function of the OS 13, C2 denotes a communication function which supports communication in the CP 20, and D0 and D1 denote domains in the main memory.

In FIG. 1, 1 corresponds to the OS function suppress processing portion 1 shown in FIG. 2, 2 corresponds to the CP data transfer request processing portion 15 shown in FIG. 2, 3 corresponds to the CP function suppress processing portion 21 shown in FIG. 2, 4 corresponds to the CP data transfer processing portion 22 shown in FIG. 2, 5 corresponds to the CP function resumption processing portion 23 shown in FIG. 2, 6 corresponds to the OS/CP data collection processing portion 16 shown in FIG. 2, and 7 corresponds to the OS function resumption processing portion 17 shown in FIG. 2.

When a communication data collection instruction is issued in response to a console command from the console 30, the operation is carried out as described below in conjunction with FIGS. 4A and 4B and processings (a) to (h) of FIG. 5.

(a) When a data collection request is issued from the console command, the communication data collection routine 32 operates.

(b) The communication data collection routine 32, first, suppresses the communication function C1 that is operating on the OS 13.

(c) Next, the communication data transfer routine 33 is requested to transfer the communication data 35 possessed by the CP 20. This request is effected by using, for example, a handshake diagnostic instruction that is sent to the CP 20 from the OS 13.

(d) The communication data transfer routine 33 suppresses the communication function C2 that is operating on the CP 20.

(e) Next, the requested communication data 35 of the CP 20 are transferred to the buffer 19 of the OS 13. The address of the buffer 19 may be fixedly determined in advance or may be designated by the OS 13 at the time of request.

(f) After the data have been transferred, the processing of the communication function C2 that had been suppressed is resumed.

(g) The communication data collection routine 32 effects necessary editing based on the communication data 34 that are referred to and updated by the communication function C1 and the communication data 35 of the CP 20 transferred to the buffer 19, and collects and outputs the data to the external memory 31.

(h) When the output to the external memory 31 is finished, the communication function C1 that had been suppressed is resumed, and the requested processing is finished.

The communication function C1 or the communication function C2 can be suppressed relying, for example, upon a method of applying an exclusive lock to a control table (not shown) that is necessarily used when the communication function C1 or the communication function C2 operates. Due to the exclusive control, the communication function C1 or the communication function C2 is no longer allowed to operate until the lock is released. Or, a suppression flag may be provided for each space or for each assignment of CPU execution right in order to limit the assignment of the CPU execution right.

In the above-mentioned embodiment, the source from where the data collection request was input and the destination to where the collected data were output was hardware. Here, however, even software may be utilized. For instance, the input medium 11 shown in FIG. 1 is used as an abnormal termination exit routine for the program, and the materials for investigating the trouble are collected in response to a data collection request therefrom. Or, the output medium 25 is used as a main memory, so that other programs may make reference to the data to carry out different processings.

Moreover, the range covered by the OS data 18 and the CP data 24 may be broadened to cover the whole system, and the main memory of the CP 20 as a whole is transferred to the region of the OS 13 and is collected by the dumping function of the OS 13, in order to carry out simultaneous dump collection based on the OS-CP interlinkage.

Figure 6B:
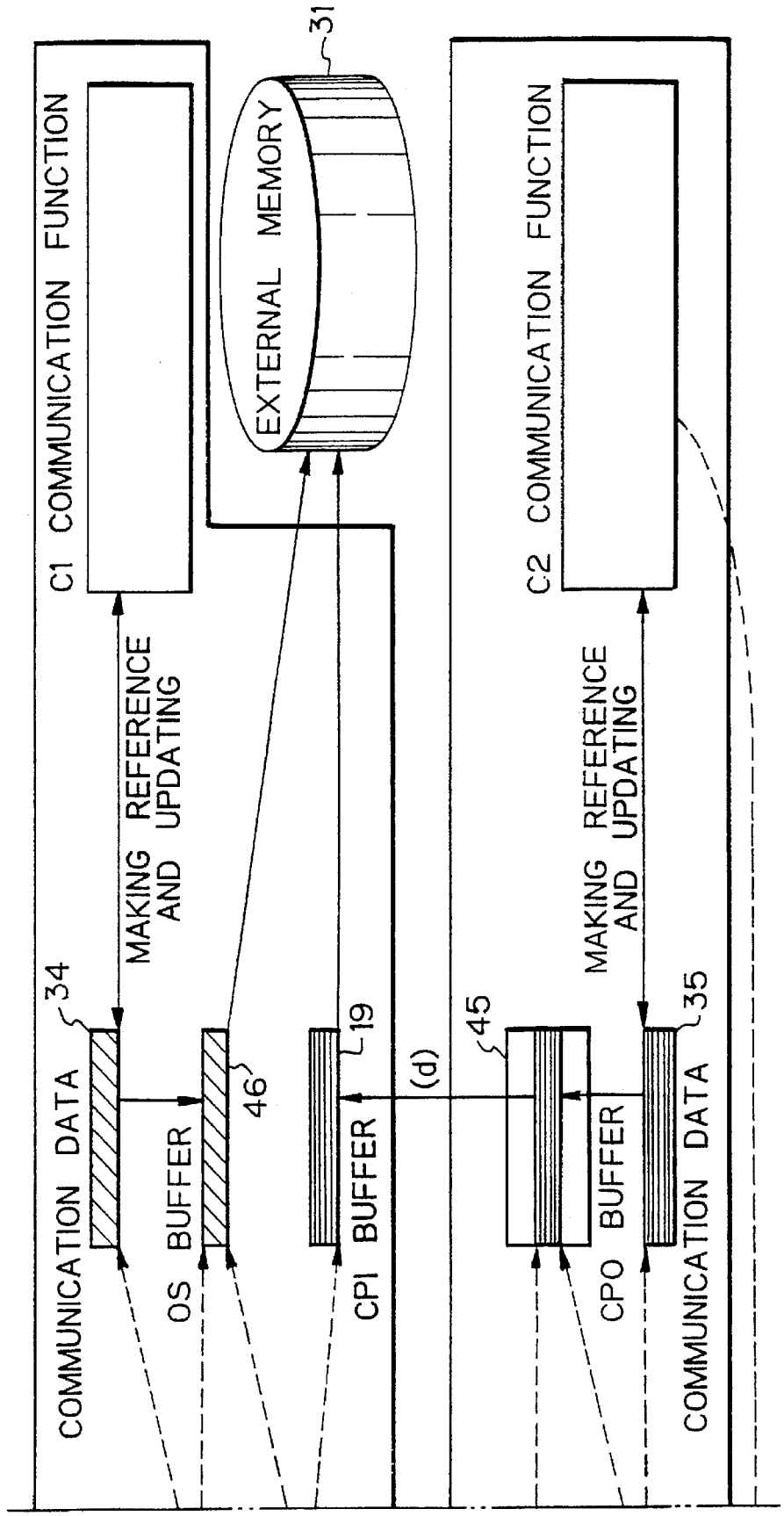

FIGS. 6A and 6B are diagrams illustrating the second fundamental constitution of FIG. 3 according to an embodiment of the present invention, and FIG. 7 is a flow chart of the embodiment of the present invention shown in FIG. 6.

FIGS. 6A and 6B show an embodiment of the present invention which collects the data of communication function in response to an input instruction of the console command. In FIGS. 6A and 6B, reference numeral 30 denotes a console, 31 denotes an external memory such as a magnetic disk or a magnetic tape, 32 denotes a communication data collection routine provided at the nucleus of the OS 13 or in the communication control sub-system, 33 denotes a communication data transfer routine provided in the CP 20, reference numeral 34 denotes communication data in the OS 13 that are to be collected, 35 denotes communication data in the CP 20 that are to be collected, C1 denotes a communication function of the OS 13, symbol C2 denotes a communication function that supports communication in the CP 20, and D0 and D1 denote domains in the main memory.

In FIGS. 6A and 6B, 1 corresponds to the OS function collection processing portion 43 shown in FIG. 3, 2 corresponds to the CP data transfer request processing portion 15 shown in FIG. 3, 4 corresponds to the CP data transfer processing portion 22 shown in FIG. 3, 6 corresponds to the OS/CP data collection processing portion 16 shown in FIG. 3, and 8 corresponds to the CP data collection processing portion 42 shown in FIG. 3.

Figure 7A:
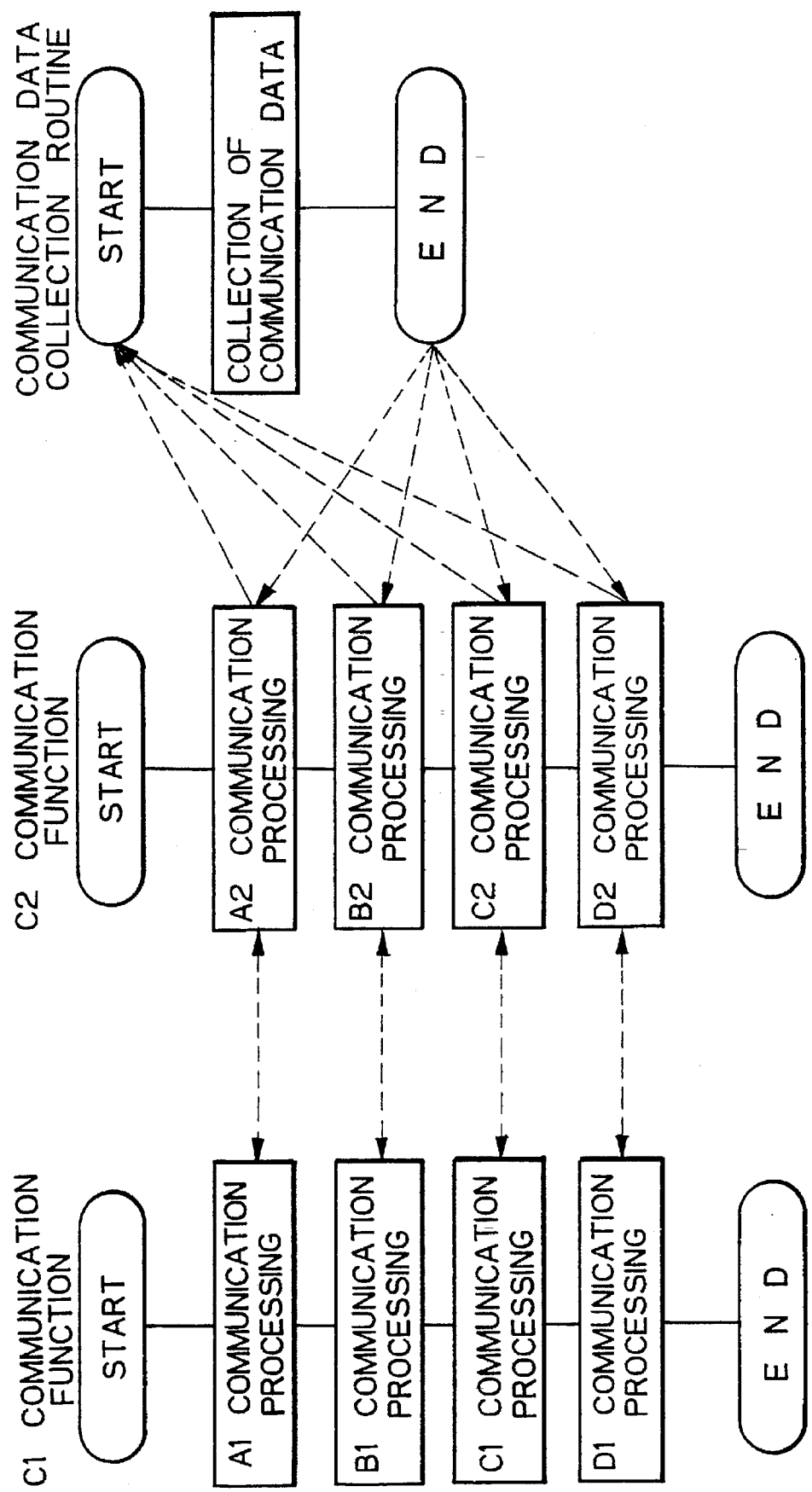

The communication functions C1 and C2 repeat the process shown in FIGS. 7A and 7B. In the case of the communication function C2, the communication data collection routine 50 operates for each of the processings, the communication data 35 to be collected are copied into an empty entry of the CP0 buffer 45, and the time of collection is recorded. As a result, the contents of the communication data 35 are accumulated in the CP0 buffer 45.

When a communication data collection instruction is issued in response to a console command from the console 30, the operation is carried out as described below in conjunction with FIG. 4 and processings (a) to (e) shown in FIGS. 7A and 7B.

(a) When a data collection request is issued from the console command, the communication data collection routine 32 operates.

(b) In the communication data collection routine 32, first, the communication data 34 to be collected are copied into the OS buffer 46, and the time of collection is recorded.

(c) Next, the communication data transfer routine 33 is requested to transfer the CP0 buffer 45 in which are accumulated the contents of communication data 35 possessed by the CP 20. This request is effected by using, for example, a handshake diagnostic instruction that is sent to the CP 20 from the OS 13.

(d) The communication data transfer routine 33 retrieves an entry that is in agreement with the time of collection of (b) above from the CP0 buffer 45 in which are accumulated the contents of the communication data 35 possessed by the CP 20, and transfers it to the CP1 buffer 19 of the OS 13 and returns. The address of the CP1 buffer 19 may be fixedly determined in advance or may be designated by the OS 13 at the time of request.

(e) The communication data collection routine 32 effects necessary editing based on the communication data 34 that are copied into the OS buffer 46 and the communication data 35 of the CP 20 transferred to the CP1 buffer 19, and collects and outputs the data to the external memory 31.

This apparatus is different from that of FIG. 4 with respect to that (1) the OS buffer 46, CP0 buffer 45 and communication data collection routine 50 are added, (2) the processings of the communication data collection routine 32 and of the communication data transfer routine 33 are changed, and (3) the communication function C2 calls the communication data collection routine 50.

The communication function C2 actuates the communication data collection routine at a break in an internal processing, so that the communication data 35 are collected.

According to the present invention as described above, two kinds of data of OS and CP are collected simultaneously or in the same environment (on the OS) at the same time, enabling effective data to be quickly collected. Therefore, pertinent data can be collected even on a virtual machine system which is operating without interruption, enabling the investigation of troubles to be quickly carried out and the reliability to be improved.

I claim:

1. An apparatus for collecting control data of a virtual machine in a computer system, wherein said apparatus comprises:

an operating system OS operating on the virtual machine stored in a main memory; and a control portion CP, said operating system OS taking the initiative in collecting OS data therein and the corresponding CP data provided by said control portion CP along with the simultaneity of both data when both OS and CP are operating, and editing and outputting data having the capability of being effectively used, wherein said OS comprises:

OS function suppress processing means for suppressing a function of the OS that uses data which is to be collected at the time of collecting the data, CP data transfer request processing means for requesting the CP to transfer the data that are related to the CP and are to be collected, OS/CP data collection processing means for editing and outputting the data that is transferred from said CP, which is related to the CP that is requested, and the data on said OS that is related to the OS, which is to be collected, and OS function resumption processing means for resuming the function of the OS that had been suppressed after said data is collected; and said CP comprises:

CP function suppress processing means for suppressing the function of the CP that uses the data which is to be collected upon receipt of a data transfer request from said OS, CP data transfer processing means for transferring the data that is related to said CP and is to be collected to a region which is accessible by said OS, and CP function resumption processing means for resuming the function of the CP that had been suppressed after said data is transferred, thereby to simultaneously collect the data related to the OS and the data related to the CP.

2. A method of collecting control data of a virtual machine in a computer system said virtual machine having a control portion CP of the virtual machine and an operating system OS operating on the virtual machine stored in a main memory, said operating system OS taking the initiative in collecting OS data therein and the corresponding CP data provided by said control portion CP along with the simultaneity of both data when both OS and CP are operating, and editing and outputting data having the capability of being effectively used, the method comprising the steps of:

suppressing function of said OS that uses the data which is to be collected at the time of collecting the data;

requesting said CP to transfer the data that is related to the CP and is to be collected after said OS is suppressed;

suppressing the function of the CP that uses the data which is to be collected in response to the data transfer request;

transferring the data that is related to the CP and is to be collected to a region which is accessible by said OS after said CP is suppressed;

resuming the function of the CP that had been suppressed after said data is transferred from said OS;

editing and outputting said OS simultaneously the data transferred from said CP and the OS data that exists on the OS; and resuming the function of said OS that had been suppressed, thereby to simultaneously collect the data related to the OS and the data related to the CP.

3. An apparatus for collecting control data of a virtual machine in a computer system, wherein said apparatus comprises:

an operating system OS operating on the virtual machine stored in a main memory; and a control portion CP, said operating system OS taking the initiative in collecting OS data therein and the corresponding CP data provided by said control portion CP along with the simultaneity of both data when both OS and CP are operating, and editing and outputting data having the capability of being effectively used, wherein:

said OS comprises:

main OS function processing means for providing a function of said OS that uses the data which are to be collected, OS data collection processing means for collecting the data used by said main OS function processing means, CP data transfer request processing means for requesting the CP to transfer the data that is related to the CP and is to be collected together with a predetermined CP data instruction signal, and OS/CP data collection processing means for editing and outputting the data transferred from said CP and the data collected by said OS data collection processing means; and said CP comprises:

CP function processing means for providing the function of said CP that uses the data which is to be collected, CP data collection processing means for collecting the data used by said CP function processing means as well as inherent data such as identifiers and a time of collection informed from said CP function processing means, and CP data transfer processing means for transferring, upon receipt of a data transfer request from said OS, a region where there are accumulated the data that is related to said CP to a region that is accessible by said OS in accordance with said predetermined CP data instructions signal and said inherent data, thereby to simultaneously collect the data related to the OS and the data related to the CP.

4. A method of collecting control data of a virtual machine according to claim 3, wherein said predetermined CP data instruction signal is a time stamp signal.

5. A method of collecting control data of a virtual machine according to claim 3, wherein said predetermined CP data instruction signal is a predetermined identifier or a dumping signal having a predetermined function.

6. A method of collecting control data of a virtual machine in a computer system, said virtual machine having a control portion CP of the virtual machine and an operating system OS operating on the virtual machine stored in a main memory, said operating system OS taking the initiative in collecting OS data therein and the corresponding CP data provided by said control portion CP along with the simultaneity of both data when both OS and CP are operating, and editing and outputting data having the capability of being effectively used, said method comprising the steps of:

collecting the OS data that is used by the OS function and that is to be collected;

collecting the CP data that are used by the CP function and that are to be collected, as well as identifiers and a time of collection notified from said CP function;

requesting said CP to transfer said CP data that correspond to said OS data together with a predetermined CP data instruction signal;

transferring, upon request of a data transfer request from said OS the CP data that is related to said CP and is to be collected to a region that is accessible by said OS in compliance with said predetermined CP data instruction signal and said identifiers and said time of collection; and editing and outputting the OS data collected by said OS and the CP data transferred from said CP, thereby to simultaneously collect the data related to the OS and the data related to the CP.

7. A method of collecting control data of a virtual machine according to claim 6, wherein said predetermined CP data instruction signal is a time stamp signal.

8. A method of collecting control data of a virtual machine according to claim 6, wherein said predetermined CP data instruction signal is a predetermined identifier or a dumping signal having a predetermined function.

* * * * *